(12) United States Patent
Ota et al.

(10) Patent No.: US 7,564,602 B2
(45) Date of Patent: Jul. 21, 2009

(54) COLOR CHART FOR ADJUSTMENT OF A COLOR PRINTER AND A COLOR MONITOR UTILIZED WITH AN ENDOSCOPE

(75) Inventors: Noriko Ota, Saitama (JP); Shunichi Ito, Tokyo (JP); Nobuaki Abe, Saitama (JP)

(73) Assignee: Hoya Corporation, Tokyo (JP)

( * ) Notice: Subject to any disclaimer, the term of this patent is extended or adjusted under 35 U.S.C. 154(b) by 828 days.

(21) Appl. No.: 10/899,102

(22) Filed: Jul. 27, 2004

(65) Prior Publication Data
US 2005/0024658 A1 Feb. 3, 2005

(30) Foreign Application Priority Data
Jul. 28, 2003 (JP) .............. P2003-202253
Jul. 28, 2003 (JP) .............. P2003-202383

(51) Int. Cl.
G03F 3/08 (2006.01)
H04N 1/60 (2006.01)
A61B 1/04 (2006.01)

(52) U.S. Cl. .................. 358/518; 358/1.9; 348/65

(58) Field of Classification Search .......... 358/1.9, 358/504, 516, 518, 519, 520, 521, 523, 527, 358/532, 530, 1.1, 3.01, 500; 356/404; 382/167, 382/274; 348/179, 223.1, 655, 65, 66, 67, 348/68, 69, 70, 71, 72, 73, 74, 75, 76, 45; 600/101, 109, 112, 160, 176, 177, 178, 180; 396/17, 16; 362/574; 399/38
See application file for complete search history.

(56) References Cited

U.S. PATENT DOCUMENTS

| | | | | |
|---|---|---|---|---|
| 1,597,830 A | * | 8/1926 | Rueger | ............. 356/422 |
| 5,012,299 A | * | 4/1991 | Sawamura et al. | ............ 399/81 |
| 5,483,360 A | * | 1/1996 | Rolleston et al. | ............ 358/518 |
| 5,710,871 A | * | 1/1998 | Tadenuma et al. | ............ 358/1.9 |
| 6,738,168 B1 | | 5/2004 | Usui et al. | |
| 2002/0085091 A1 | | 7/2002 | Takeshige et al. | |
| 2002/0163527 A1 | * | 11/2002 | Park | ............ 345/594 |
| 2004/0001229 A1 | * | 1/2004 | Hanyu | ............ 358/2.1 |
| 2004/0056965 A1 | * | 3/2004 | Bevans et al. | ............ 348/222.1 |

FOREIGN PATENT DOCUMENTS

| | | |
|---|---|---|
| JP | 5-036328 | 5/1993 |
| JP | 8-037604 | 2/1996 |
| JP | 8-152566 | * 6/1996 |

OTHER PUBLICATIONS

Co-pending U.S. Appl. No. 10/898,959.
English language Abstract of JP 8-37604, Feb. 6, 1996, Note: document No. is JP8037604.
English language Abstract of JP 2001-128020, May 11, 2001.
English language Abstract of JP 2002-200038, Jul. 16, 2002.
Co-pending U.S. Appl. No. 10/898,959, filed Jul. 27, 2004.

* cited by examiner

*Primary Examiner*—King Y Poon
*Assistant Examiner*—Peter L Cheng
(74) *Attorney, Agent, or Firm*—Greenblum & Bernstein, P.L.C.

(57) ABSTRACT

A color chart for a color adjustment of a color printer and a color monitor attached to an endoscope, has a predetermined number of color cells. The color cells have the same form, and are arranged in one of a grid state and a linear state. Each of the color cells is formed by blending two colors from a group of three colors comprising red, green, and blue, according to a predetermined ratio, in an additive color process. The color cells show a gradation of color such that a color tone of each of the color cells changes continuously in one direction.

7 Claims, 14 Drawing Sheets

Fig. 4

34 color adjustment for printer and monitor

Cy  — R  : ±0  ~Pr
(Cyan)  (Red)

Mg  — G  : ±0  ~Pg
(Magenta)  (Green)

Ye  — B  : ±0  ~Pb
(Yellow)  (Blue)

........... | ~C
........... |
........... |

Darkness    : ±0  ........... |
(a contrast of shadows)

Brightness : ±0  ........... |
(a contrast of highlights)

Sharpness   : ±0  ........... |
(image quality)

Gamma       : ±0  ........... |
(gamma correction)

Fig. 12 color adjustment for printer and monitor (first step)

Cy  −R    : +4  ⎫Pr₁  ........ ⎫
(Cyan) (Red)                    ⎬C
Mg  −G    : +2  ⎫Pg₁  ........  ⎭
(Magenta) (Green)
Ye  −B    : ±0  ⎫Pb₁  ........
(Yellow) (Blue)

Darkness      : ±0
(a contrast of shadows)

Brightness : ±0
(a contrast of highlights)

Sharpness    : ±0
(image quality)

Gamma         : ±0
(Gamma correction)

37 color adjustment for printer and monitor (second step)

Cy   −R    : −4  ·······|······· }C
(Cyan) (Red)            }Pr₂

Mg   −G    : +2  ···········|··· 
(Magenta)(Green)            }Pg₂

Ye   −B    : +4  ···············|
(Yellow)(Blue)                   }Pb₂

Darkness      : ±0  ·······|·······
(a contrast of shadows)

Brightness : ±0  ·······|·······
(a contrast of highlights)

Sharpness  : ±0  ·······|·······
(image quality)

Gamma       : ±0  ·······|·······
(gamma correction)

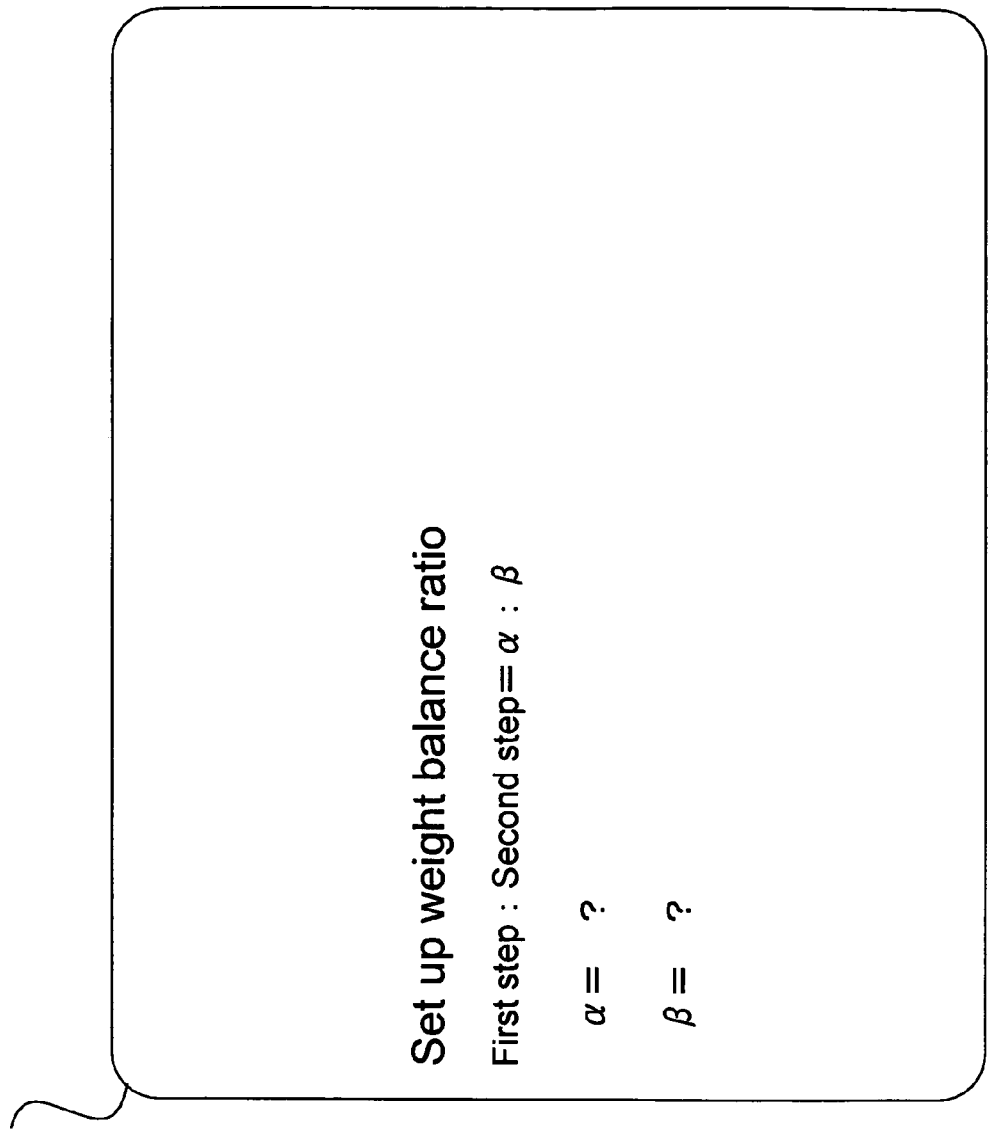

COLOR CHART FOR ADJUSTMENT OF A COLOR PRINTER AND A COLOR MONITOR UTILIZED WITH AN ENDOSCOPE

BACKGROUND OF THE INVENTION

1. Field of the Invention

The present invention relates to an endoscope and in particular to an apparatus for the color adjustment of a color printer and a color monitor connected to the endoscope.

2. Description of the Related Art

Endoscopes are used widely in the field of medicine, especially for the observation and the inspection of the inside of an organ. Such endoscopes consist of a color scope, a color processing unit, a color printer, and a color monitor. The color scope images a subject and is controlled by the color processing unit. The electric signals obtained during the imaging process are converted to image signals by the processing unit and are then output to the color printer and the color monitor. The converted image signals are analogue signals and are supplied to the color printer and the color monitor. The supplied image signals can be converted to a hard copy, in other words printed out by the color printer, and kept as a soft copy, in other words stored in a memory and indicated on a color monitor.

The endoscope is used for the observation and the inspection of the inside of an organ. Accordingly, it is desirable that the color tone of the output images which are imaged by an endoscope, resemble as much as possible the real color of the photographic subject. It is desirable that the color tone of the output image by the color printer resemble the color tone of the output image by the color monitor.

Each component of an endoscope has a color reappearance range or a color imaging range which differs. A color adjustment method which takes into consideration the color range of each component is needed.

Japanese unexamined patent publication (KOKAI) No. 08-152566 discloses a method for the color adjustment of a color scope, a color processing unit, and a color monitor, by using a color chart. This invention discloses a method for the color adjustment of the color scope which is an imaging apparatus, and the color monitor which is an output apparatus.

However, the above disclosed method does not disclose a method for the color adjustment of the color printer and the color monitor which are output devices.

SUMMARY OF THE INVENTION

The color printer produces colors by overlaying yellow, magenta, and cyan which are the alternative three primaries, according to a predetermined ratio. The color monitor produces colors by mixing red, green, and blue which are the primaries, according to a predetermined ratio. The color printer has a color range different from that of the color monitor (see FIG. 1).

For the color adjustment of the color printer and the color monitor, it is necessary to adjust seven adjustment parameters.

The first adjustment parameter is a red adjustment parameter which is for the adjustment of the cyan and red complementary color relationship. The second adjustment parameter is a green adjustment parameter which is for the adjustment of the magenta and green complementary color relationship. The third adjustment parameter is a blue adjustment parameter which is for the adjustment of the yellow and blue complementary color relationship.

The fourth adjustment parameter is a darkness adjustment parameter which is for the adjustment of the gradation of a dark part, or a contrast of shadows. The fifth adjustment parameter is a brightness adjustment parameter which is for the adjustment of the gradation of a bright part, or a contrast of highlights. The sixth adjustment parameter is a sharpness adjustment parameter which is for adjusting image quality. The seventh adjustment parameter is a gamma adjustment parameter which is for a gamma correction.

Adjusting seven adjustment parameters is difficult, because reproduced colors are different between a color printer and a color monitor, and color ranges are different between a color printer and a color monitor.

The connections between a color processing unit, a color printer, and a color monitor are usually analogue connections, because of the requirement for exchangeability of different apparatus having different manufacturers. It is not possible to carry out the adjustment of seven adjustment parameters automatically, unlike for PC's etc. which are able to connect by digital signals, as well as analogue signals.

Accordingly, the operator of the endoscope has to carry out the color adjustment of about seven adjustment parameters. An objective method has not been established yet. The conventional method is to manually compare the output image by the color printer and the output image on the color monitor, which were imaged by the operator using the color scope. Devices such as color printers etc., have fourteen adjustment levels, so that it is necessary to select the optimal parameter from 7×14 combinations, in the color adjustment process.

The color tone of the color printer and also the color monitor changes with the passing of time for each apparatus. Accordingly, strictly, it is necessary to carry out the color adjustment of the above adjustment parameters whenever the endoscope is used. At least, it is necessary to carry out the color adjustment of the above adjustment parameters at the time the printer ribbon is changed.

Therefore, an object of the present invention is to provide a device that can carry out the color adjustment of the color printer and the color monitor easily and objectively, where the connections are analogue signal connections.

According to the present invention, a color chart for a color adjustment of a color printer and a color monitor attached to an endoscope, comprises a predetermined number of color cells. The color cells have the same form, and are arranged in one of a grid state and a linear state. Each of the color cells is formed by blending two colors from a group of three colors comprising red, green, and blue, according to a predetermined ratio. The color cells show a gradation of color such that a color tone of each of the color cells changes continuously in one direction.

BRIEF DESCRIPTION OF THE DRAWINGS

The objects and advantages of the present invention will be better understood from the following description, with reference to the accompanying drawings in which:

FIG. 4 is a plane view of a first screen pattern;

FIG. 12 is a plane view of a third screen pattern;

FIG. 13 is a plane view of a fourth screen pattern; and

FIG. 14 is a plane view of a fifth screen pattern.

DESCRIPTION OF THE PREFERRED EMBODIMENTS

Figure 1:
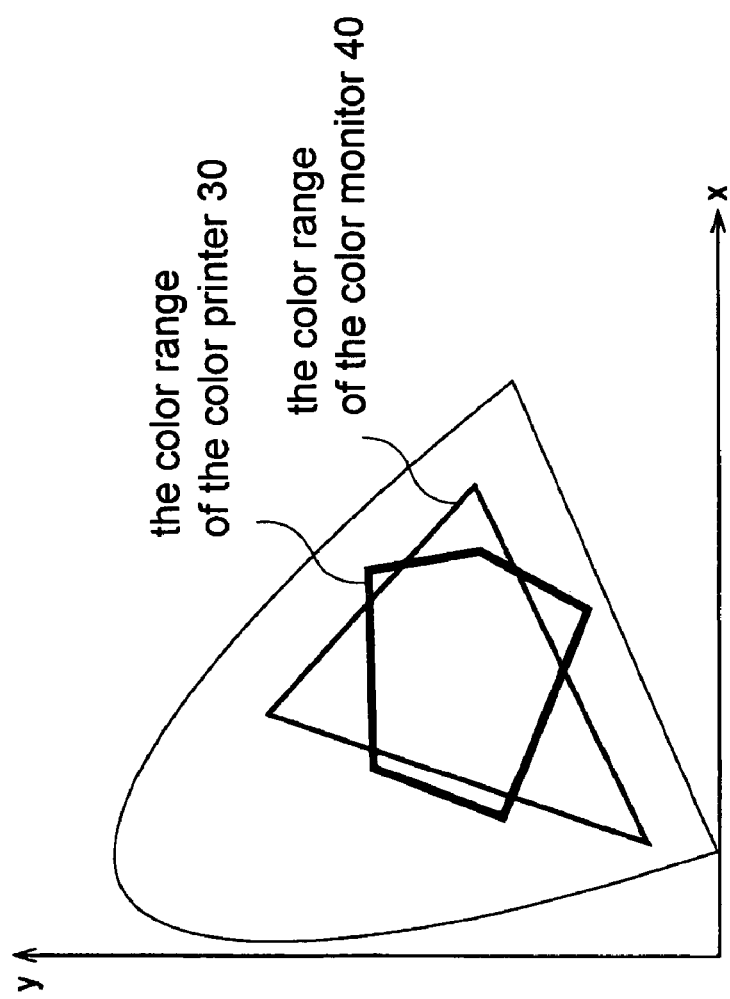
FIG. 1 is a chromaticity diagram which shows the difference in color range between a color printer and a color monitor.
Figure 2:
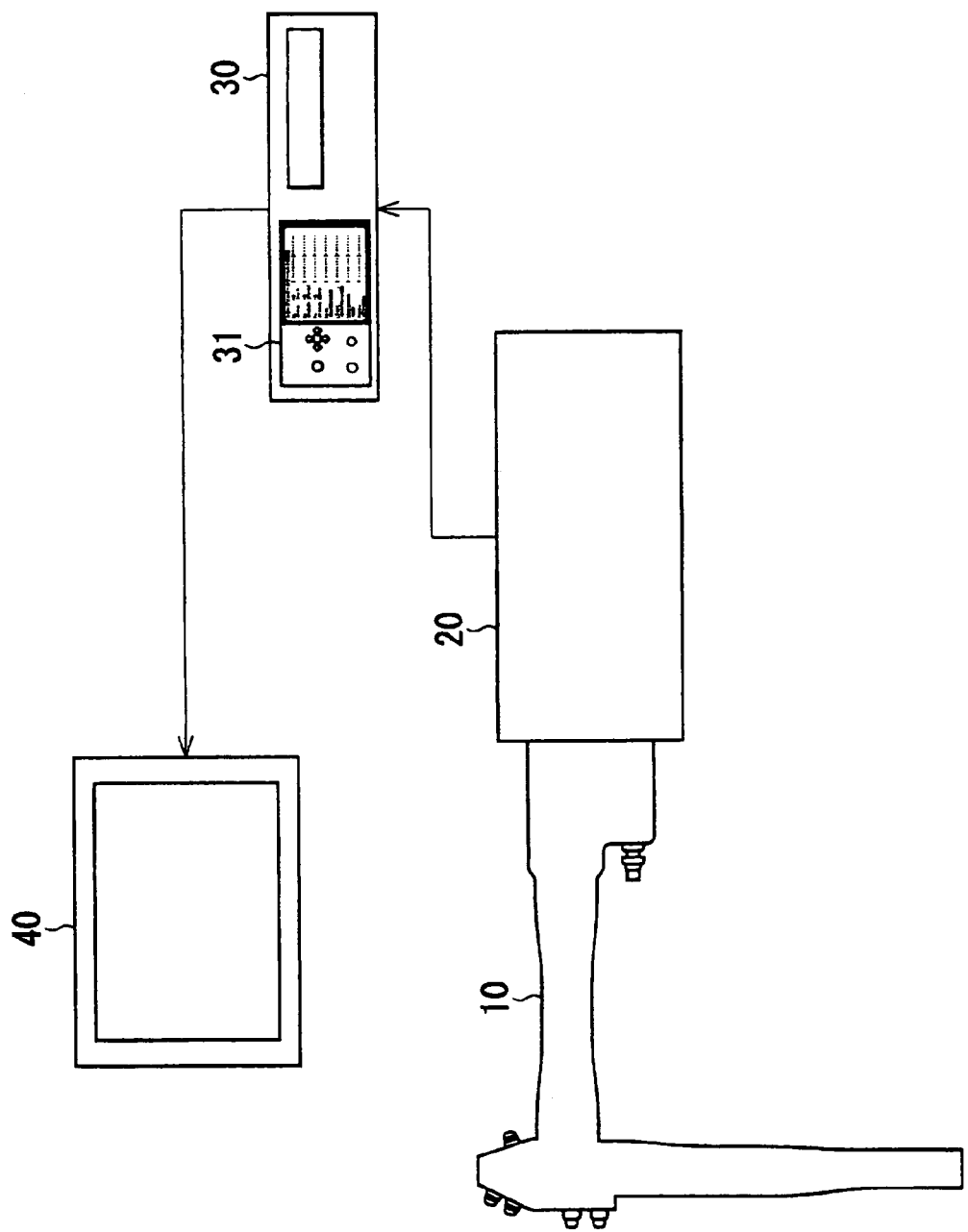
FIG. 2 is a block diagram of an endoscope.

The present invention is described below with reference to the embodiments shown in the drawings. As shown in FIG. 2, an endoscope relating to a first embodiment is provided with a color scope 10, a color processing unit 20, a color printer 30, and a color monitor 40. The color scope 10 images a subject and is controlled by the color processing unit 20. The electric signals obtained during the imaging process are converted to image signals by the processing unit 20 and are then output to the color printer 30 and the color monitor 40. The converted image signals are analogue signals and are supplied to the color printer 30 and the color monitor 40. The supplied image signals can be converted to a hard copy, in other words printed out by the color printer 30, and kept as a soft copy, in other words stored in a memory and indicated on a color monitor 40. An operator can observe the photographic subject that was imaged with the color scope 10 as a first output image by the color printer 30, and as a second output image by the color monitor 40.

The color scope 10 has an imaging unit, a lighting unit, and so on. The imaging unit has an imaging device such as a CCD which is not depicted. The lighting unit has a lighting lens system for illuminating the photographic subject, for example inside a dark interior hollow of an organ. The lighting unit supplies appropriate light to the photographic subject. The imaging unit images the photographic subject and then converts the image to electric signals.

The color processing unit 20 has a signal processing section such as DSP and so on, which is not depicted. The color processing unit 20 converts electric signals of an image which was imaged by the color scope 10, to image signals which can be output to the color printer 30 and also the color monitor 40, and supplies the image signals to the color printer 30 and also the color monitor 40. Further, the color processing unit 20 has a light source which is not depicted, so that the color processing unit 20 supplies light through a light guidance system to the lighting lens system which is located in the tip of the color scope 10.

The color printer 30 is a printer which can read analogue image signals. The color printer 30 adjusts the image signals which were imaged by the color scope 10, and converted and supplied by the color processing unit 20, with adjustment parameters of the color printer 30, so that the color printer 30 produces an accurate hard copy (print out). Further, the image signals supplied to the color printer 30 are supplied to the color monitor 40 without adjustment. Therefore, the signals sent to the color monitor 40 are not influenced by the color adjustment parameter of the color printer 30.

Figure 3:
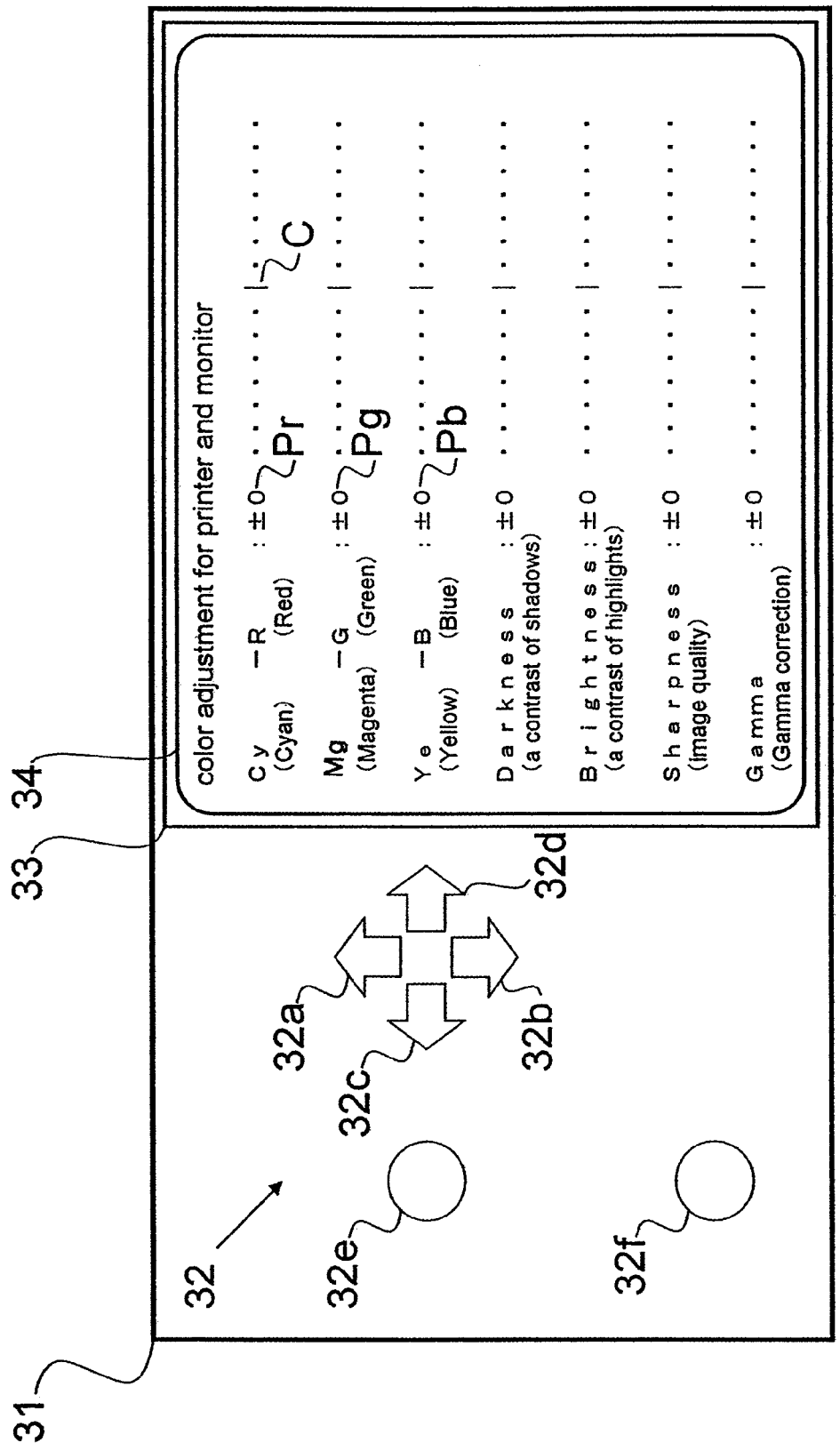
FIG. 3 is a front view of a color adjustment apparatus in the first embodiment.

As shown in FIGS. 2 and 3, the color printer 30 has a color adjustment apparatus 31. The color adjustment apparatus 31 combines the color tone of the first output image by the color printer 30 and the second output image by the color monitor 40 by an operation of the operator. The color adjustment apparatus 31 has a color adjustment operation unit 32, and a color adjustment indicating unit 33. The color adjustment is carried out by observing the first output image with the second output image and by operating the color adjustment apparatus 31 and the color adjustment indicating unit 33. The color adjustment apparatus 31 has other keys which are not depicted.

Figure 6:
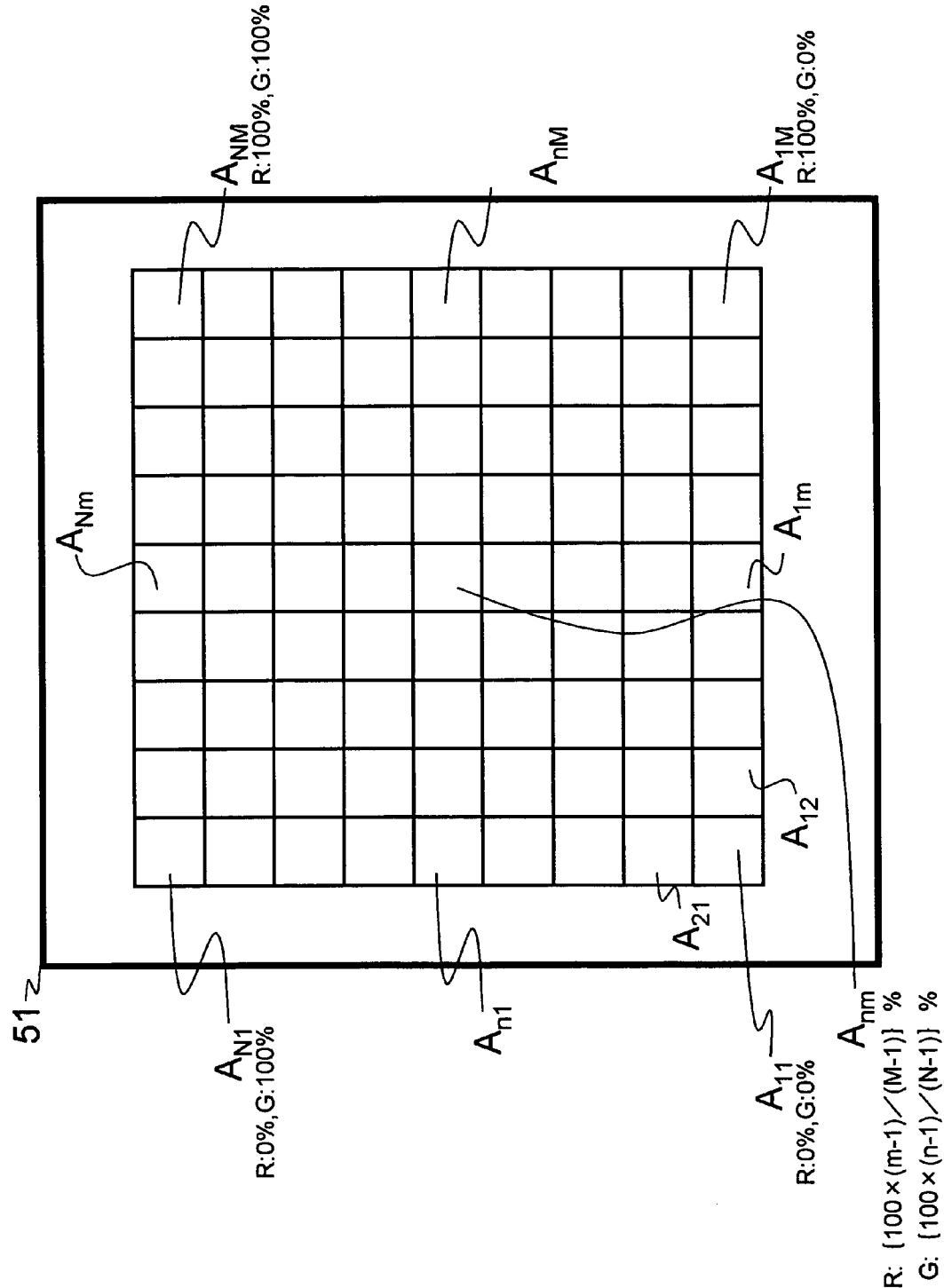
FIG. 6 is a plane view of a first color chart.

The color adjustment operation unit 32 has direction keys 32a, 32b, 32c, and 32d, and a decision key 32e. The keys 32a, 32b, 32c, and 32d are used to control the movement of a cursor C on a color adjustment screen of the color adjustment indicating unit 33, while key 32e is used to select the input operation when the color adjustment is done (see FIG. 3). Further, the color adjustment operation unit 32 has a selection key 32f which is used to indicate color-adjustment items for the first color chart 51, as shown in FIG. 6.

The color adjustment indicating unit 33 has an indicating device, such as an LCD etc, so that the color adjustment indicating unit 33 can have two screen patterns indicated there on. One of the two screen patterns is a first screen pattern 34 (see FIG. 4), the other is a second screen pattern 35 (see FIG. 5).

The first screen pattern 34 indicates all seven adjustment parameters and seven adjustment items, so that all the adjustment parameters can be adjusted.

A red adjustment parameter Pr is for the adjustment of the cyan and red complementary color relationship, so that a first adjustment item is "Cy (Cyan)—R (Red)".

A green adjustment parameter Pg is for the adjustment of the magenta and green complementary color relationship, so that a second adjustment item is "Mg (Magenta)— G (Green)".

A blue adjustment parameter Pb is for the adjustment of the yellow and blue complementary color relationship, so that a third adjustment item is "Ye (Yellow)—B (Blue)".

A darkness adjustment parameter is for the adjustment of the gradation of a dark part, or a contrast of shadows, so that a fourth adjustment item is "Darkness (a contrast of shadows)". The adjustment of the contrast of shadows helps reveal details hidden in the shadows, and compensates for underexposure.

A brightness adjustment parameter is for the adjustment of the gradation of a bright part or a contrast of highlights, so that a fifth adjustment item is "Brightness (a contrast of highlights)". The adjustment of the contrast of highlights helps reveal details hidden in the highlights, and compensates for overexposure.

A sharpness adjustment parameter is for adjusting image quality, so that a sixth adjustment item is "Sharpness".

A gamma adjustment parameter is for a gamma correction, so that a seventh adjustment item is "Gamma correction".

The second screen pattern 35 indicates two of seven adjustment parameters and seven adjustment items, so that two parameters can be adjusted. The two adjustment parameters are color adjustment parameters. When the selection key 32f for the first color chart 51 is operated, the second screen pattern 35 is indicated (see FIG. 5).

All the parameters can be adjusted by moving the cursor C on the screen by operating the direction keys 32a, 32b, 32c, and 32d, and the decision key 32e.

The color monitor 40 is a typical monitor that is available in the market, and that can indicate images based on analogue image signals. The color monitor 40 can indicate images based on image signals of an object, which is imaged by the color scope 10, that have been converted to analogue signals by the color processing unit 20 and supplied there by, via the color printer 30, to the color monitor 40, so that the color monitor 40 indicates the images.

Figure 7:
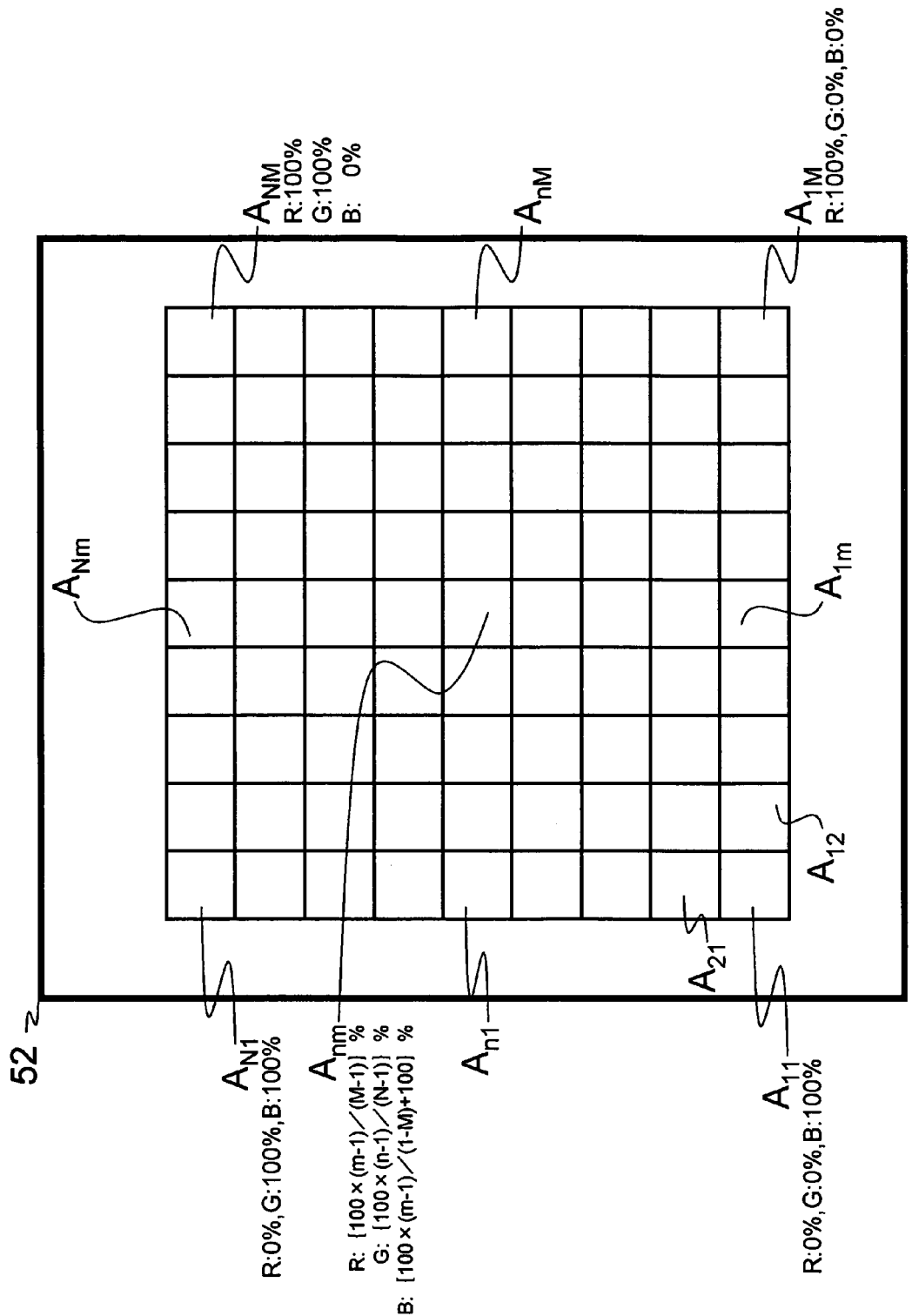
FIG. 7 is a plane view of a second color chart.

FIG. 6 shows the first color chart 51 for the color adjustment of the color printer 30 and the color monitor 40. FIG. 7 shows the second color chart 52 for the color adjustment of the color printer 30 and the color monitor 40.

The first color chart 51 comprises a predetermined number of color cells which have the same form, and are arranged in a grid state. Each of the color cells is formed by blending red and green, according to a predetermined ratio, in an additive color process. The color cells show a gradation of color such that a color tone of each of the color cells changes continuously in one direction. For example, in FIG. 6, a red blending ratio increases continuously in each of the color cells in a right direction, and a green blending ratio increases continuously in each of the color cells in a top direction.

The second color chart 52 comprises a predetermined number of color cells which have the same form, and are arranged in a grid state. Each of the color cells is formed by blending red, green, and blue, according to a predetermined ratio, in an additive color process. The color cells show a gradation of color such that a color tone of each of the color cells changes continuously in one direction. For example, in FIG. 7, a red blending ratio increases continuously in each of the color cells in a right direction, a blue blending ratio decreases continuously in each of the color cells in a right direction, and a green blending ratio increases continuously in each of the color cells in a top direction.

The size of the first color chart 51 is set so that all of the first color chart 51 can be imaged by the color scope 10, when the first color chart 51 is arranged at a similar distance that a photographic subject would be imaged at, in for example an interior hollow of an organ.

The size of the second color chart 52 is also set so that all of the second color chart 52 can be imaged by the color scope 10, when the second color chart 52 is arranged at the same distance at which a photographic subject would be imaged at, in for example an interior hollow of an organ.

The first color chart 51 is a matrix of N rows and M columns, so that N×M color cells are arranged in the first color chart 51. The second color chart 52 is a matrix of N rows and M columns, so that N×M color cells are arranged in the second color chart 52. N and M are natural numbers. If the numerical values of N and M are large, the changes in gradation of the first and second color charts 51 and 52 will be smooth. The color cells have the same rectangular form.

The outer layer of cells forming the matrix which is the color chart, has first, second, third, and fourth apexes. The first apex is located in a first corner cell of the matrix. The second apex is located in a second corner cell which is to the right of the first apex. The third apex is located in a third corner cell which is above the second apex. The fourth apex is located in a fourth corner cell which is above the first apex.

The position of the first corner cell, representing the first apex, is $A_{11}$. In other words, $A_{11}$ is located in the bottom row of the first column, that is, it is located at the bottom left of the matrix.

The color cell $A_{12}$ is positioned in the same row as $A_{11}$ but is one column to the right of $A_{11}$. The position of the color cell $A_{1m}$ is (m−1) columns to the right of $A_{11}$ and in the same row.

The position of the color cell $A_{1M}$ is (M−1) columns to the right of $A_{11}$, in other words, $A_{1M}$ is located in the bottom-right corner of the matrix. Or, the position of the second corner cell representing the second apex, is $A_{1M}$.

The color cell $A_{21}$ is positioned in the same column as $A_{11}$ but one row above. The color cell $A_{n1}$ is positioned (n−1) rows above $A_{11}$ and in the same column.

The color cell $A_{N1}$ is positioned (N−1) rows above $A_{11}$, in other words, $A_{N1}$ is located in the top-left corner of the matrix. Or, the position of the fourth corner cell representing the fourth apex is $A_{N1}$.

The color cell $A_{22}$ is positioned 1 row above and 1 column to the right of $A_{11}$. The color cell $A_{nm}$ is positioned (m−1) columns to the right of, and (n−1) rows above $A_{11}$.

The color cell $A_{NM}$ positioned (M−1) columns to the right of and (N−1) rows above $A_{11}$, in other words, $A_{NM}$ is located in the top right corner of the matrix. Or, the position of the third corner cell representing the third apex, is $A_{NM}$.

In the first color chart 51, the N×M cells that have red and green, which are two of the three primaries, blended in accordance with a predetermined ratio, are arranged in accordance with a standard arrangement. Specifically, the color cell having red $\{100 \times (m-1) \div (M-1)\}\%$, and green $\{100 \times (n-1) \div (N-1)\}\%$ is $A_{nm}$. The color cell having red 0%, and green 0%, or the black cell, is arranged at $A_{11}$. The color cell having red 100%, and green 0%, or the red cell, is arranged at $A_{1M}$. The color cell having red 0%, and green 100%, or the green cell, is arranged at $A_{N1}$. The color cell having red 100%, and green 100%, or the yellow cell, is arranged at $A_{NM}$. In this case, the first color chart 51 is a gradation arrangement of red, yellow, and green, without blue.

In the second color chart 52, the N×M cells that have red, green, and blue, which are the three primaries, blended in accordance with a predetermined ratio, are arranged in accordance with a standard arrangement. Specifically, the color cell having red $\{100 \times (m-1) \div (M-1)\}\%$, green $\{100 \times (n-1) \div (N-1)\}\%$, and blue $\{100 \times (m-1) \div (1-M)+100\}\%$ is arranged at $A_{nm}$. The color cell having red 0%, green 0%, and blue 100%, or the blue cell, is arranged at $A_{11}$. The color cell having red 100%, green 0%, and blue 0%, or the red cell, is arranged at $A_{1M}$. The color cell having red 0%, green 100%, and blue 100%, or the cyan cell, is arranged at $A_{N1}$. The color cell having red 100%, green 100%, and blue 0%, or the yellow cell, is arranged at $A_{NM}$. In this case, the second color chart 52 is a gradation arrangement of red, yellow, blue, and cyan.

The color adjustment of the color printer 30 and the color monitor 40 using the first color chart 51 or the second color chart 52 will be explained, for the first embodiment.

In the case of a usual endoscope use, the first color chart 51 is imaged by the color scope 10. Usually, the color constitution of the interior hollow of an organ centers on red and yellow. Accordingly, for endoscope observation the color adjustment is sufficient if these color tones are adjusted. The first color chart 51 does not have a blue component, because of this. Accordingly, when the first color chart 51 is used, the color adjustment of the red and yellow can be easily carried out. It is desirable that the imaging conditions in the interior hollow of an organ and the imaging conditions for imaging the first color chart 51, be the same. Specifically, the first color chart 51 is imaged using only the light from the light source of the color processing unit 20, without the influence of other light. Electric signals imaged by the color scope 10 are converted by the color processing unit 20, to the image signals which can be used by the color printer 30 and the color monitor 40, so that the image signals are supplied to the color printer 30 and the color monitor 40 by the color processing unit 20. The supplied image signals are printed out by the color printer 30 as a hard copy of the image, and can be indicated on a screen.

The operator selects one of the color-adjustment items on the first screen pattern 34 by operating the top and bottom direction keys 32a and 32b of the direction keys 32a, 32b, 32c, and 32d that are on the color adjustment apparatus 31 (see FIG. 4), then the operator operates the decision key 32e.

The color of the letter of the color-adjustment item, corresponding to the cursor C location, differs from the color of the letters of other color-adjustment items, which are not depicted. Accordingly, it is easy to understand which color-adjustment item is selected. The value of the selected adjustment parameter can be changed by operating the left and right direction keys 32c and 32d and also the decision key 32e.

Furthermore, in the first embodiment, the red adjustment parameter Pr which is set up as the first adjustment item, shows a change in value from the prescribed standard output value of the red primary color signal. Similarly, the green adjustment parameter Pg which is set up as the second adjustment item, shows the change in value from the prescribed standard output value of the green primary color signal. Similarly, the blue adjustment parameter Pb which is set up as the third adjustment item, shows the change in value from the prescribed standard output value of the blue primary color signal. When the cursor C on the color adjustment indicating unit 33, is moved toward the primary color position (right direction in FIG. 4) from the standard position which is located at almost the center of the moving range (see FIG. 4), by operating the left and right direction keys 32c and 32d, the parameters Pr, Pg, and Pb are increased. When the cursor C is moved toward the complementary color position (left direction in FIG. 4), the parameters Pr, Pg, and Pb are decreased.

For example, the value of the red adjustment parameter Pr which is the first adjustment item, "Cy (Cyan)—R (Red)", changes to plus 1, when the position of the cursor C is moved 1 graduation toward the red primary color, from the standard position. Similarly, the value of the red adjustment parameter Pr changes to minus 1, when the position of the cursor C is moved 1 graduation toward the cyan complementary color, from the standard position. A similar relationship holds for the green adjustment parameter Pg which is the second adjustment item, "Mg (Magenta)—G (Green)"; and the blue adjustment parameter Pb which is the third adjustment item, "Ye (Yellow)—B (Blue)". FIG. 4 shows a condition where the value of the red, green, and blue adjustment parameters Pr, Pg, and Pb are ±0.

Figure 5:
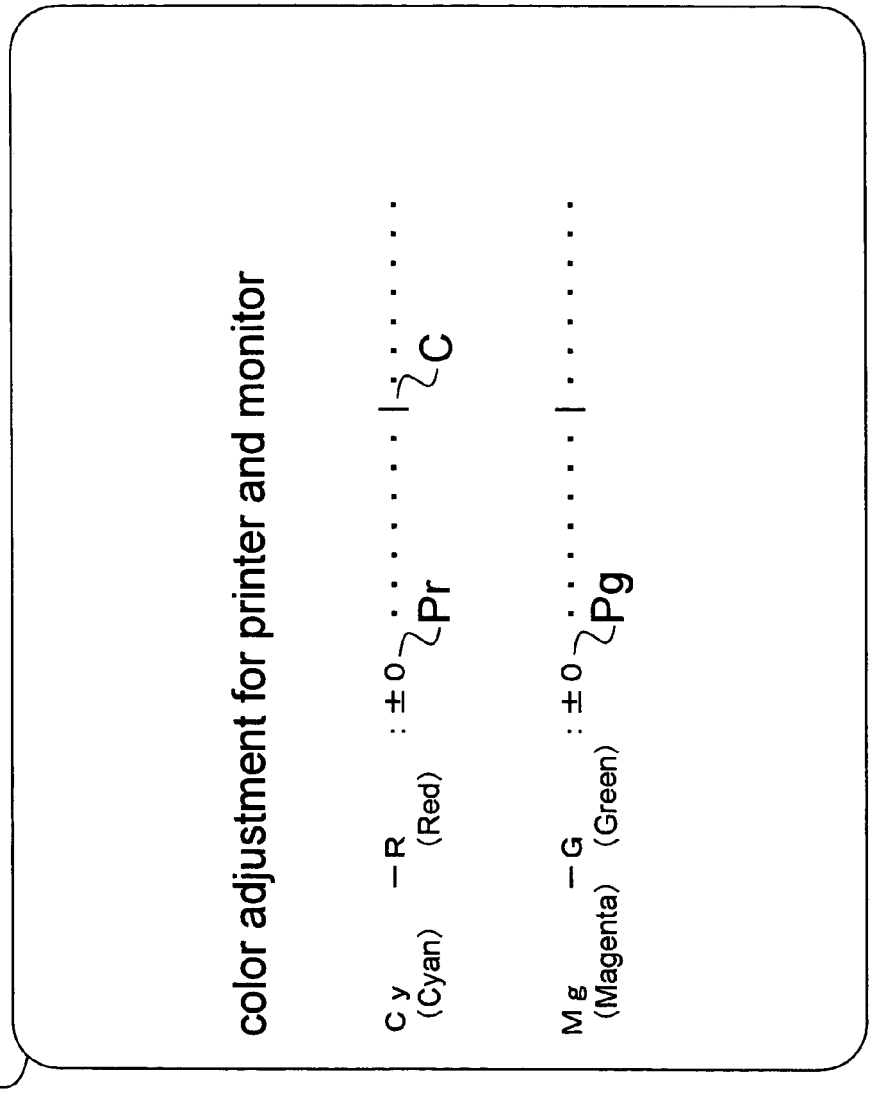
FIG. 5 is a plane view of a second screen pattern.

In the first embodiment, the color adjustment operation unit 32 has the selection key 32f. When the selection key 32f is operated by the operator, only two adjustable items (the first and second adjustment items "Cy (Cyan)—R (Red)", and "Mg (Magenta)—G (Green)") and parameters (the red, and green adjustment parameters Pr and Pg), the second screen pattern 35, are indicated on the color adjustment indicating unit 33, which is depicted in FIG. 5.

Figure 8:
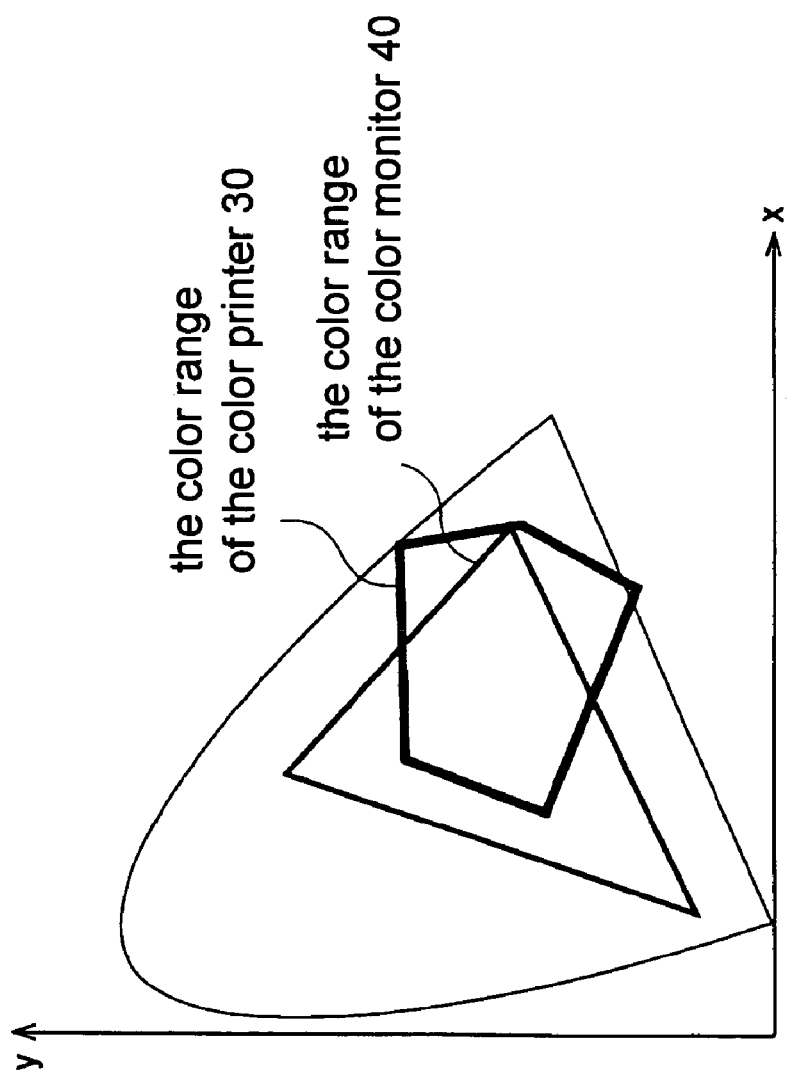
FIG. 8 is a chromaticity diagram which shows the difference in the color range between the color printer and the color monitor, when the color reappearance range of the color printer is changed.

The operator visually compares the first output image, the image of the first color chart 51 printed by the color printer 30, and the second output image, the image of the first color chart 51 displayed on the color monitor 40, by observing a color change in a particular direction in the first color chart 51. First and second color tones can be perceived when the operator carries out the color adjustment between the color printer 30 and the color monitor 40 using the first color chart 51. The first color tone is from black (the color cell $A_{11}$) to red (the color cell $A_{1M}$), and the second color tone is from red (the color cell $A_{1M}$) to yellow (the color cell $A_{NM}$). When the first color tone is adjusted, the operator changes the value of the red adjustment parameter Pr which is the first adjustment item, "Cy (Cyan)—R (Red)". When the second color tone is adjusted, the operator changes the value of the green adjustment parameter Pg which is the second adjustment item, "Mg (Magenta)—G (Green)". After the values of the red and green adjustment parameters Pr and Pg have been changed, the operator prints out a hard copy using the color printer 30 again. For example, the color range of the color printer 30 changes as shown in FIG. 8, in this case red is strengthened regarding the degree of strength of cyan and red.

Again, the operator can compare the first output image, the image of the first color chart 51 from the color printer 30, and the second output image, the image of the first color chart 51 displayed on the color monitor 40, by observing a color change in a particular direction in the first color chart 51. If the operator judges that the first output image of the color printer 30 does not yet agree with the second output image of the color monitor 40, the values of the red and green adjustment parameters Pr and Pg can be further changed by operation of the direction keys 32a, 32b, 32c, and 32d, and the decision key 32e. The operator prints out a hard copy again using the color printer 30. Until it is judged that the first and second color tones, of the first color chart 51 output by the color printer 30, and the first and second color tones, of the first color chart 51 output on the color monitor 40 are equal, the same operations are repeated.

In this way, even if the values of the other five adjustment parameters, such as the blue adjustment parameter Pb etc., are not adjusted, it is possible to carry out the color adjustment of the color printer 30 and the color monitor 40 of the endoscope simply and objectively, by adjusting the first and second color tones, which are important in the interior hollow of an organ. Further, because the color adjustment apparatus 31 has the selection key 32f for the first color chart 51, the operator focuses only on the adjustment of the necessary color adjustment parameter (Pr and Pg), and can quickly complete the adjustment work.

Next, the color adjustment of the color printer 30 and the color monitor 40 by using the second color chart 52 is explained.

When the interior hollow of an organ is observed, the red and yellow colors are usually important. But, sometimes the interior hollow of an organ is observed after indigo dyeing, and hence blue is important in addition to red and yellow. Therefore, in this case, the second color chart 52 which has a gradation of red, yellow, and blue, is effective.

The second color chart 52 is imaged by the color scope 10, similar to the first color chart 51. The imaging conditions, and the process in which the result of imaging is output to the color printer 30 and the color monitor 40, is the same as that used for the first color chart 51.

The operator visually compares a third output image, the image of the second color chart 52 from the color printer 30, and a fourth output image, the image of the second color chart 52 displayed on the color monitor 40, by observing a color change in a particular direction in the second color chart 52. Third and fourth color tones can be perceived when the operator carries out the color adjustment between the color printer 30 and the color monitor 40 using the second color chart 52. The third color tone is from blue (the color cell $A_{11}$) to red (the color cell $A_{1M}$), and the fourth color tone is from red (the color cell $A_{1M}$) to yellow (the color cell $A_{NM}$). When the third color tone is adjusted, the operator changes the value of the red adjustment parameter Pr which is the first adjustment item, "Cy (Cyan)—R (Red)", and the blue adjustment parameter Pb which is the third adjustment item, "Ye (Yellow)—B (Blue)". In this case, when the value of the red adjustment parameter Pr is changed by plus 2 points, the value of the blue adjustment parameter Pb is changed by minus 2 points. When the fourth color tone is adjusted, the operator changes the value of the green adjustment parameter Pg which is the second adjustment item, "Mg (Magenta)—G (Green)". After the values of the red, green, and blue adjustment parameters Pr, Pg, and Pb have been changed, the operator prints out a hard copy using the color printer 30.

Again, the operator compares (the third output image) the image of the second color chart 52 from the color printer 30, and (the fourth output image) the image of the second color chart 52 displayed on the color monitor 40, by observing a color change in a particular direction in the second color chart 52. Until it is judged that the third and fourth color tones, of the second color chart 52 output by the color printer 30, and the third and fourth color tones, of the second color chart 52 output on the color monitor 40 are equal, the same operations, which means the operations of the direction keys 32a, 32b, 32c, and 32d, the decision key 32e, and the printing out, are repeated. This process is the same as the color adjustment process for the first color chart 51.

In this way, even if the values of the other four adjustment parameters, such as the darkness adjustment parameter etc., are not adjusted, it is possible to carry out the color adjustment of the color printer 30 and the color monitor 40 of the endoscope simply and objectively, by adjusting the third and fourth color tones which are important in the interior hollow of an organ. Especially, for the value of the red adjustment parameter Pr and the blue adjustment parameter Pb, the absolute value is the same and only the sign is reversed. Accordingly, only two kinds of color adjustment parameters have to be adjusted, substantially. One of the two kinds of color adjustment parameters is the red adjustment parameter (or the blue adjustment parameter), the other is the green adjustment parameter.

Next, the third and fourth color charts 51' and 52' are explained in the second embodiment. The third color chart 51' has a first guide indication section 53. The fourth color chart 52' has a second guide indication section 54. The first and second guide indication sections 53 and 54 show color-adjustment items and directions of a hue change, so that they can facilitate speeding up the color adjustment work.

Figure 9:
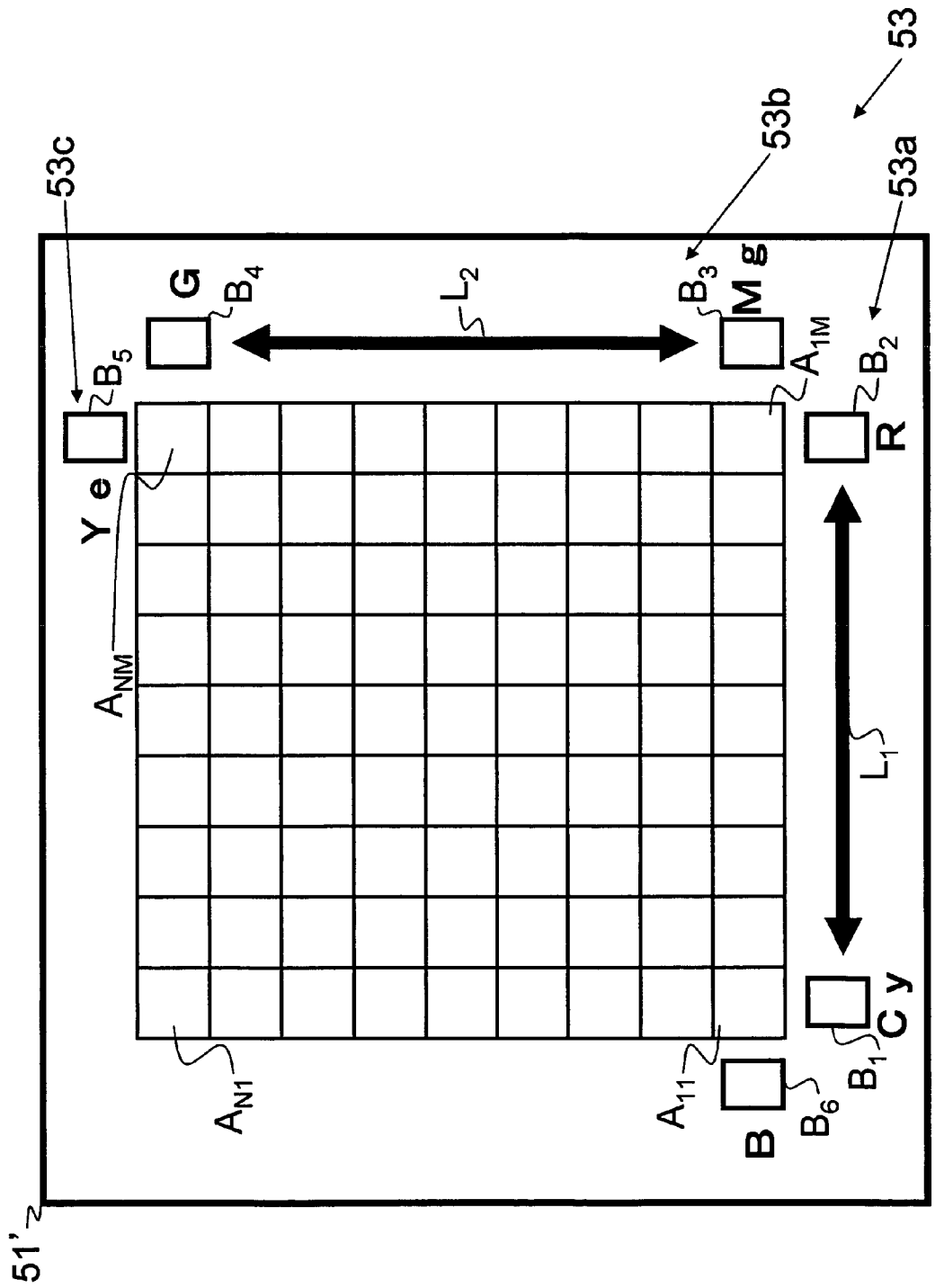
FIG. 9 is a plane view of a third color chart.

The first guide indication section 53 on the third color chart 51' is explained (see FIG. 9). The third color chart 51' has the first guide indication section 53, which is outside the grid. The first guide indication section 53 consists of first, second, and third adjusting guides 53a, 53b, and 53c. The color gradient inside the grid of the third color chart 51' is similar to the color gradient inside the grid of the first color chart 51.

The first adjusting guide 53a has a cyan guide cell $B_1$, a red guide cell $B_2$, and a first line segment $L_1$ which has right and left direction arrows. The cyan guide cell $B_1$ is arranged in the vicinity of the black cell $A_{11}$. The red guide cell $B_2$ is arranged in the vicinity of the red cell $A_{1M}$. The first line segment $L_1$ is arranged between the cyan guide cell $B_1$ and the red guide cell $B_2$. The cyan and red guide cells $B_1$ and $B_2$ are arranged near the bottom row.

The second adjusting guide 53b has a magenta guide cell $B_3$, a green guide cell $B_4$, and a second line segment $L_2$ which has top and bottom direction arrows. The magenta guide cell $B_3$ is arranged in the vicinity of the red cell $A_{1M}$. The green guide cell $B_4$ is arranged in the vicinity of the yellow cell $A_{NM}$. The second line segment $L_2$ is arranged between the magenta guide cell $B_3$ and the green guide cell $B_4$. The magenta and green guide cells $B_3$ and $B_4$ are arranged along the outside column.

The third adjusting guide 53c has a yellow guide cell $B_5$, and a blue guide cell $B_6$. The yellow guide cell $B_5$ is arranged in the vicinity of the yellow cell $A_{NM}$. The blue guide cell $B_6$ is arranged in the vicinity of the black cell $A_{11}$. The yellow and blue guide cells $B_5$ and $B_6$ are arranged at diagonal corners.

The cell having red 0%, green 100%, and blue 100% is the cyan guide cell $B_1$. The cell having red 100%, green 0%, and blue 100% is the magenta guide cell $B_3$. The cell having red 100%, green 100%, and blue 0% is the yellow guide cell $B_5$.

The first adjusting guide 53a has "Cy", the name of the cyan guide cell, printed in the vicinity of the cyan guide cell $B_1$, and "R", the name of the red guide cell, printed in the vicinity of the red guide cell $B_2$.

The second adjustment guide 53b has "Mg", the name of the magenta guide cell, printed in the vicinity of the magenta guide cell $B_3$, and "G", the name of the green guide cell, printed in the vicinity of the green guide cell $B_4$.

The third adjustment guide 53c has "Ye", the name of the yellow guide cell, printed in the vicinity of the yellow guide cell $B_5$, and "B" the name of the blue guide cell, printed in the vicinity of the blue guide cell $B_6$.

The first, second, and third adjustment guides 53a, 53b, and 53c are arranged without overlapping on the third color chart 51'.

Figure 10:
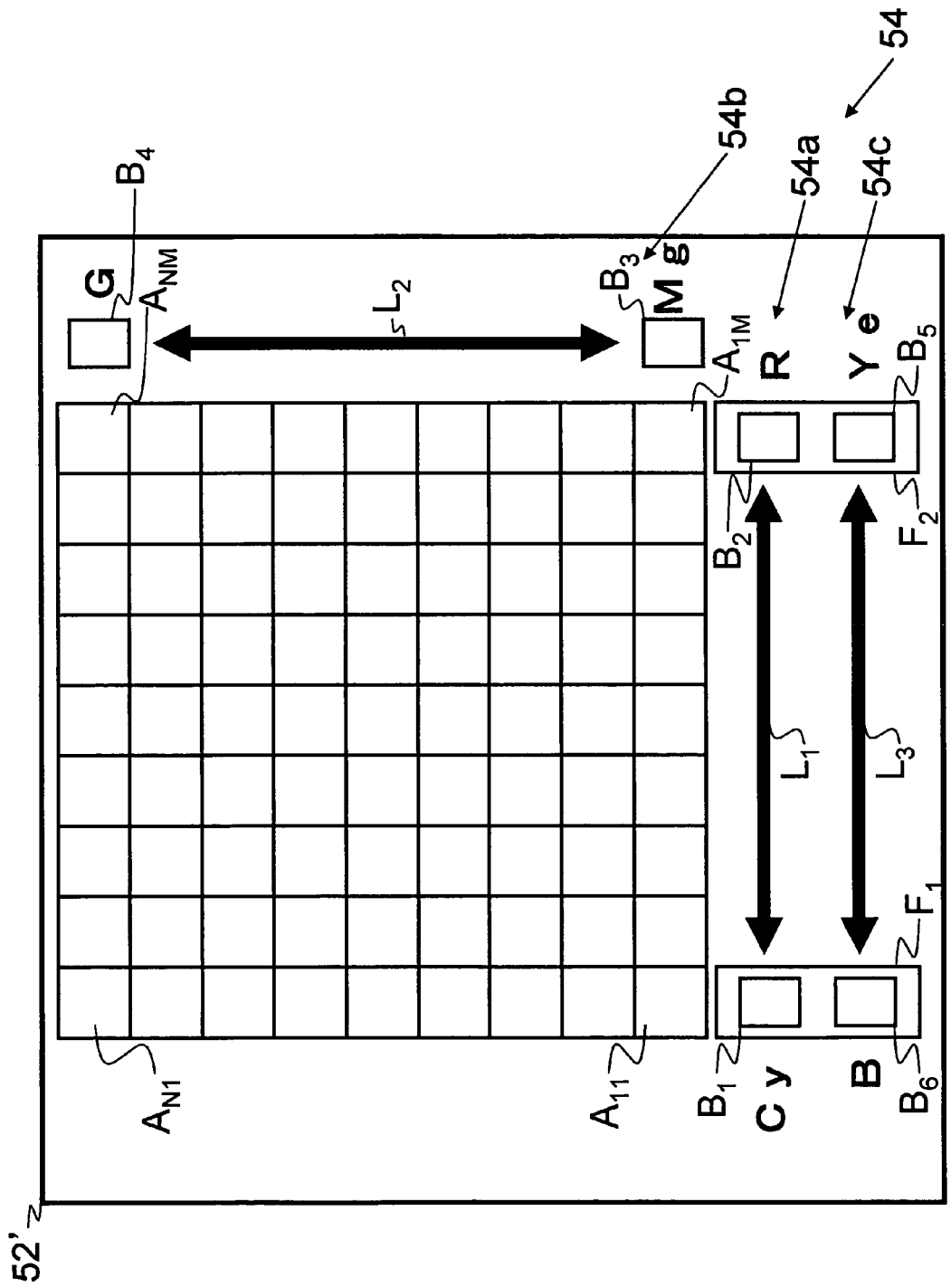
FIG. 10 is a plane view of a fourth color chart.
Figure 11:
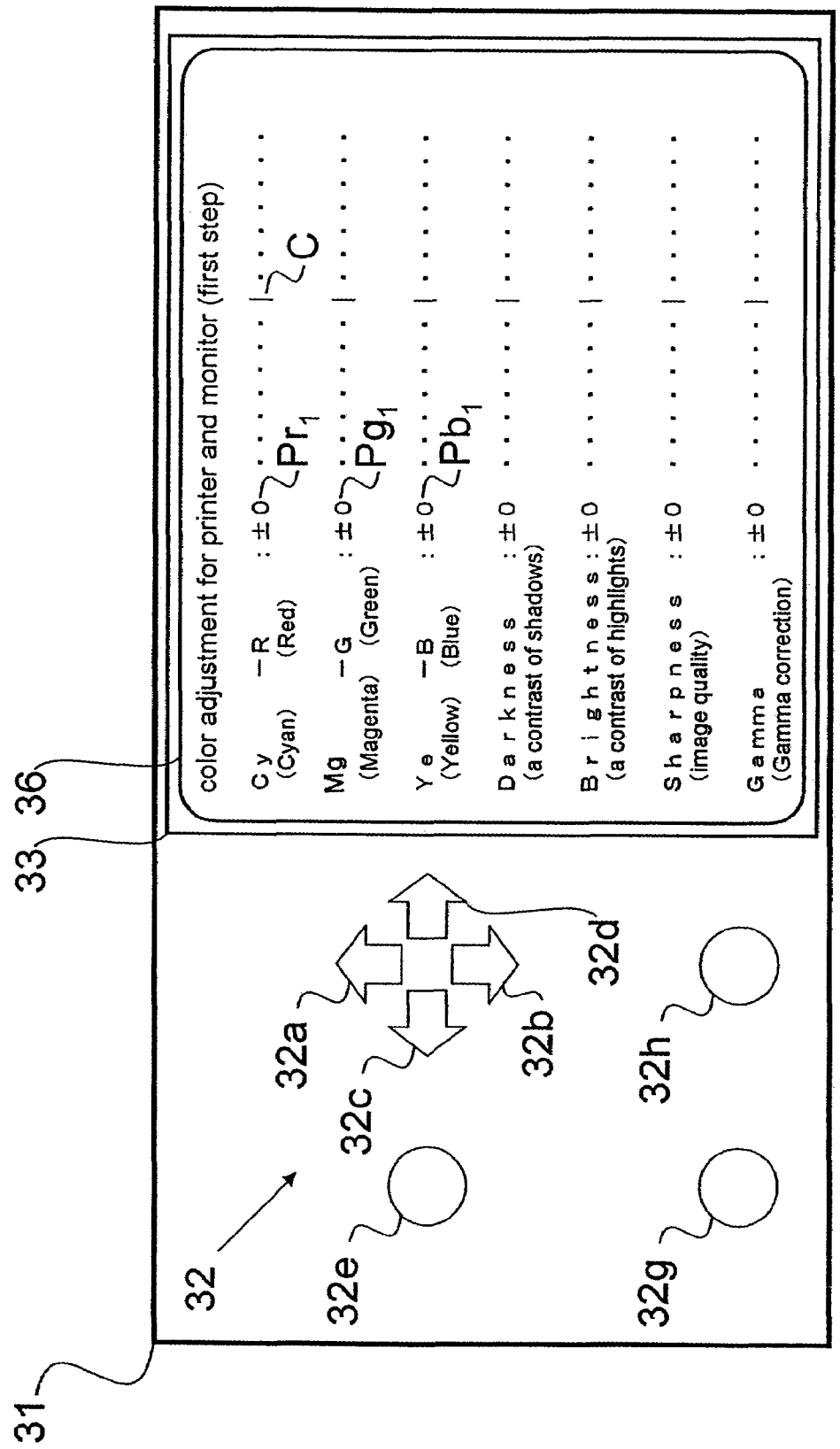
FIG. 11 is a front view of a color adjustment apparatus in the second embodiment.

The second guide indication section 54 on the fourth color chart 52' is explained with regard to FIG. 10. The fourth color chart 52' has the second indication section 54, which is outside of the grid. The second guide indication section 54 consists of fourth, fifth and sixth adjusting guides 54a, 54b, and 54c. The color gradient inside the grid of the fourth color chart 52' is similar to the color gradient inside the grid of the second color chart 52.

The fourth adjusting guide 54a has a cyan guide cell $B_1$, a red guide cell $B_2$, and a first line segment $L_1$ which has right and left direction arrows. The cyan guide cell $B_1$ is arranged in the vicinity of the blue cell $A_{11}$. The red guide cell $B_2$ is arranged in the vicinity of the red cell $A_{1M}$. The first line segment $L_1$ is arranged between the cyan guide cell $B_1$ and the red guide cell $B_2$. The cyan and red guide cells $B_1$ and $B_2$ are arranged near the bottom row.

The fifth adjusting guide 54b has a magenta guide cell $B_3$, a green guide cell $B_4$, and a second line segment $L_2$ which has top and bottom direction arrows. The magenta guide cell $B_3$ is arranged in the vicinity of the red cell $A_{1M}$. The green guide cell $B_4$ is arranged in the vicinity of the yellow cell $A_{NM}$. The second line segment $L_2$ is arranged between the magenta guide cell $B_3$ and the green guide cell $B_4$. The magenta and green guide cells $B_3$ and $B_4$ are arranged (along the outside) near the last column.

The sixth adjusting guide 54c has a yellow guide cell $B_5$, a blue guide cell $B_6$, and a third line segment $L_3$ which has right and left arrows. The yellow guide cell $B_5$ is arranged in the vicinity of the red cell $A_{1M}$. The blue guide cell $B_6$ is arranged in the vicinity of the blue cell $A_{11}$. The third line segment $L_3$ is arranged between the yellow guide cell $B_5$ and the blue guide cell $B_6$. The yellow and blue guide cells $B_5$ and $B_6$ are arranged near the bottom row.

The fourth adjusting guide 54a has "Cy", the name of the cyan guide cell, printed in the vicinity of the cyan guide cell $B_1$, and "R", the name of the red guide cell, printed in the vicinity of the red guide cell $B_2$.

The fifth adjustment guide 54b has "Mg", the name of the magenta guide cell, printed in the vicinity of the magenta guide cell $B_3$, and "G", the name of the green guide cell, printed in the vicinity of the green guide $B_4$.

The sixth adjustment guide 54c has "Ye", the name of the yellow guide cell, printed in the vicinity of the yellow guide cell $B_5$, and "B", the name of the blue guide cell, printed in the vicinity of the blue guide cell $B_6$.

The cyan guide cell $B_1$ and the blue guide cell $B_6$ are surrounded by a first frame $F_1$. The red guide cell $B_2$ and the yellow guide cell $B_5$ are surrounded by a second frame $F_2$. It is easy to see the change in color tone, when adjusting the values of the first adjustment parameter Pr and the second adjustment parameter Pb, because of these frames $F_1$ and $F_2$.

The fourth, fifth, and sixth adjustment guides 54a, 54b, and 54c are arranged without overlapping on the fourth color chart 52'. For example, the fourth adjustment guide 54a is arranged between the grid of the fourth color chart 52' and the sixth adjustment guide 54c.

The color adjustment process using the third color chart 51' is similar to the color adjustment process using the first color chart 51. The color adjustment process using the fourth color chart 52' is similar to the color adjustment process using the second color chart 52.

But, the third color chart 51' has the first guide indication section 53. Similarly, the fourth color chart 52' has the second guide indication section 54. The operator can judge the value by which color adjustment parameter has to be changed at a glance, to obtain the color tone that the operator wants. Accordingly, the operator can carry out the color adjustment work quickly, without difficulty and without performing a wrong operation.

For example, when the operator wants to adjust red and yellow by using the third color chart 51', it is obvious at a glance that it is good if the value of the green adjustment parameter Pg, which is the second adjustment item "Mg (Magenta)—G (Green)", is changed. Further, if the operator wants to strengthen yellow, using the third color chart 51', it is obvious at a glance that it is good if the value of the green adjustment parameter Pg, is increased.

The color adjustment, for the color printer 30 and the color monitor 40 is possible, by adjusting only color adjustment parameters that are important for color tone, in the case where the interior hollow of an organ etc. is observed by using the endoscope as above. However, it is possible to strictly carry out the color adjustment as follows. Specifically, the direction keys 32a~32d, and the decision key 32e are operated. The first screen pattern 34 is indicated in the color adjustment indicating unit 33. All seven kinds of adjustment parameters can be adjusted.

Next, the second embodiment of the present invention will be explained. The structure of the endoscope is identical to that in the first embodiment. Each component in the color scope 10, the color processing unit 20, the color printer 30, and the color monitor 40 is identical to that in the first embodiment. Each of the first, second, third, and fourth color charts 51, 52, 51', and 52' is identical to that in the first embodiment. Only the constructions dissimilar to those in the first embodiment will be explained in the following.

The color adjustment operation unit 32 further has a memory key 32g, and a ratio setting key 32h. When the memory key 32g is operated after color adjustment of the color printer 30 and the color monitor 40 by using the first or second color chart 51, or 52, a first red adjustment parameter $Pr_1$ etc. are stored by the color printer 30. The ratio setting key 34h is used to set first and second weight balance ratios. The first and second weight balance ratios will be explained later.

The color adjustment indication unit 33 indicates third, fourth, and fifth screen patterns 36, 37, and 38 (see FIGS. 12-14). The fifth screen pattern 38 is used to set the first and second weight balance ratios.

The method of the color adjustment of the color printer 30 and the color monitor 40 using the first color chart 51 or the second color chart 52 will be explained, for the second embodiment. The method of the color adjustment for the second embodiment has first, second, and third steps.

The first step has a first imaging process, a first comparing process, a first adjusting process, and a first setting up process.

In the first imaging process, the first color chart 51 is imaged by the color scope 10 for the color adjustment the endoscope. Instead of the first color chart 51, the third color chart 51' may be used. Usually, the color constitution of the interior hollow of an organ centers on red and yellow. Accordingly, for endoscope observation the color adjustment is sufficient if these color tones are adjusted. It is desirable that the imaging conditions in the interior hollow of an organ and the imaging conditions for imaging the first color chart 51 be the same. Specifically, the first color chart 51 is imaged using only the light from the light source of the color processing unit 20, without the influence of other light. Electric signals imaged by the color scope 10 are converted by the color processing unit 20, to the image signals which can be used by the color printer 30 and the color monitor 40, so that the image signals are supplied to the color printer 30 and the color monitor 40 by the color processing unit 20. The supplied image signals are printed out by the color printer 30 as a hard copy of the image, and can be indicated on a screen.

The operator selects one of the color-adjustment items on the first screen pattern 34 by operating the top and bottom direction keys 32a and 32b of the direction keys 32a, 32b, 32c, and 32d that are on the color adjustment apparatus 31 (see FIG. 12), then the operator operates the decision key 32e. The color of the letter of the color-adjustment item, corresponding to the cursor C location, differs from the color of the letter of other color-adjustment items, which is not depicted. Accordingly, it is easy to understand which color-adjustment item is selected. The value of the selected adjustment parameter can be changed by operating the left and right direction keys 32c and 32d and also the decision key 32e.

The red, green, and blue adjustment parameters Pr, Pg, and Pb, are defined as first red, green, and blue adjustment parameters $Pr_1$, $Pg_1$, and $Pb_1$, when the first color chart 51 is used for the color adjustment. The red, green, and blue adjustment parameters Pr, Pg, and Pb, are defined as second red, green, and blue adjustment parameters $Pr_2$, $Pg_2$, and $Pb_2$, when the second color chart 52 is used for the color adjustment. The optimal red, green, and blue adjustment parameters Pr, Pg, and Pb obtained by computing first red, green, and blue adjustment parameters $Pr_1$, $Pg_1$, and $Pb_1$, and second red, green, and blue adjustment parameters $Pr_2$, $Pg_2$, and $Pb_2$, are defined as a third red, green, and blue adjustment parameters $Pr_3$, $Pg_3$, and $Pb_3$. FIG. 12 shows the values of the first red, green, and blue adjustment parameters $Pr_1$, $Pg_1$, and $Pb_1$ as +4, +2, and ±0.

In the first comparing process, the operator visually compares the first output image, the image of the first color chart 51 printed by the color printer 30, and the second output image, the image of the first color chart 51 displayed on the color monitor 40, by observing a color change in a particular direction in the first color chart 51. First and second color tones can be perceived when the operator carries out the color adjustment between the color printer 30 and the color monitor 40 using the first color chart 51. The first color tone is from black (the color cell $A_{11}$) to red (the color cell $A_{1M}$), and the second color tone is from red (the color cell $A_{1M}$) to yellow (the color cell $A_{NM}$).

In the first adjusting process, when the first color tone is adjusted, the operator changes the value of the first red adjustment parameter $Pr_1$ which is the first adjustment item, "Cy (Cyan)—R (Red)". When the second color tone is adjusted, the operator changes the value of the first green adjustment parameter $Pg_1$ which is the second adjustment item, "Mg (Magenta)—G (Green)". After the values of the first red and green adjustment parameters $Pr_1$ and $Pg_1$ have been changed, the operator prints out a hard copy using the color printer 30.

Again, in the first comparing process, the operator can compare the first output image, the image of the first color chart 51 from the color printer 30, and the second output image of the image of the first color chart 51 displayed on the color monitor 40, by observing a color change in a particular direction in the first color chart 51.

If the operator judges that the first output image of the color printer 30 does not yet agree with the second output result of the color monitor 40, in the first adjusting process, the values of the first red and green adjustment parameters $Pr_1$ and $Pg_1$ can be further changed by operation of the direction keys 32a, 32b, 32c, and 32d, and the decision key 32e. The operator prints out a hard copy again using the color printer 30. Until it is judged that the first and second color tones, of the first color chart 51 output by the color printer 30, and the first and second color tones, of the first color chart 51 output on the color monitor 40 are equal, the same operations are repeated.

In the first setting up process, when it is judged that the first and second color tones, of the first color chart 51 output by the color printer 30, and the first and second color tones, of the first color chart 51 output on the color monitor 40 are equal, the operator stores the values of the first red, green, and blue adjustment parameters $Pr_1$, $Pg_1$, and $Pb_1$ at this time in a memory of the color adjustment apparatus 31 by operating the memory key 32g.

Specifically, FIG. 12 shows the third screen pattern 36 that indicates the values of the first red, green, and blue adjustment parameters $Pr_1$, $Pg_1$, and $Pb_1$. In this case, the values of the first red, green, and blue adjustment parameters $Pr_1$, $Pg_1$, and $Pb_1$ are +4, +2, and ±0. These are stored in a memory of the color adjustment apparatus 31 by operating the memory key 32g.

The second step has a second imaging process, a second comparing process, a second adjusting process, and a second setting up process. In the second imaging process, the second color chart 52 is imaged by the color scope 10 for the color adjustment of the endoscope after indigo dyeing. Instead of the second color chart 52, the fourth color chart 52' may be used. When the interior hollow of an organ is observed, the red and yellow colors are usually important. But, sometimes the interior hollow of an organ is observed after indigo dyeing, and hence blue is important in addition to red and yellow. Therefore, in this case, the second color chart 52 which has a gradation of red, yellow, and blue, is effective.

In the second imaging process, the second color chart 52 is imaged by the color scope 10, similar to the first color chart 51. The imaging conditions, and the process in which the result of imaging is output to the color printer 30 and the color monitor 40, is the same as that used for the first color chart 51.

In the second comparing process, the operator visually compares a third output image, the image of the second color chart 52 from the color printer 30, and a fourth output image, the image of the second color chart 52 displayed on the color monitor 40, by observing a color change in a particular direction in the second color chart 52. Third and fourth color tones can be perceived when the operator carries out the color adjustment between the color printer 30 and the color monitor 40 using the second color chart 52. The third color tone is from blue (the color cell $A_{11}$) to red (the color cell $A_{1M}$), and the fourth color tone is from red (the color cell $A_{1M}$) to yellow (the color cell $A_{NM}$).

In the second adjusting process, when the third color tone is adjusted, the operator changes the value of the second red adjustment parameter $Pr_2$ which is the first adjustment item, "Cy (Cyan)—R (Red)", and the blue adjustment parameter Pb which is the third adjustment item, "Ye (Yellow)—B (Blue)". In this case, when the value of the second red adjustment parameter $Pr_2$ is changed by plus 2 points, the value of the second blue adjustment parameter $Pb_2$ is changed by minus 2 points. When the fourth color tone is adjusted, the operator changes the value of the second green adjustment parameter $Pg_2$ which is the second adjustment item, "Mg (Magenta)—G (Green)". After the values of the second red, green, and blue adjustment parameters $Pr_2$, $Pg_2$, and $Pb_2$ have been changed, the operator prints out a hard copy using the color printer 30.

Again, in the second comparing process, the operator compares (the third output image) the image of the second color chart 52 from the color printer 30, and (the fourth output image) the image of the second color chart 52 displayed on the color monitor 40, by observing a color change in a particular direction in the second color chart 52. Until it is judged that the third and fourth color tones, of the second color chart 52 output by the color printer 30, and the third and fourth color tones, of the second color chart 52 output on the color monitor 40 are equal, the same operations, which means the operations of the direction keys 32a, 32b, 32c, and 32d, the decision key 32e, and the printing out, are repeated. This process is the same as the color adjustment process for the first color chart 51.

In the second setting up process, when it is judged that the third and fourth color tones, of the second color chart 52 output by the color printer 30, and the third and fourth color tones, of the second color chart 52 output on the color monitor 40 are equal, the operator stores the values of the second red, green, and blue adjustment parameters $Pr_2$, $Pg_2$, and $Pb_2$ at this time in a memory of the color adjustment apparatus 31 by operating the memory key 32g.

Specifically, FIG. 13 shows the forth screen pattern 37 that indicates the values of the second red, green, and blue adjustment parameters $Pr_2$, $Pg_2$, and $Pb_2$. In this case, the values of the second red, green, and blue adjustment parameters $Pr_2$, $Pg_2$, and $Pb_2$ are −4, +2, and +4. These are stored in a memory of the color adjustment apparatus 31 by operating the memory key 32g.

The third step is a computing process. In the computing process, the third red, green, and blue adjustment parameters $Pr_3$, $Pg_3$, and $Pb_3$ are computed on the basis of the first red, green, and blue adjustment parameters $Pr_1$, $Pg_1$, and $Pb_1$, and the second red, green, and blue adjustment parameters $Pr_2$, $Pg_2$, and $Pb_2$ which are stored in the memory of the color adjustment apparatus 31. The computing process is based on first and second weight balance ratios $\alpha$ and $\beta$. The first weight balance ratio $\alpha$ is optionally set according to the frequency of use of the first color chart 51 compared to the second color chart 52, by the operator. The second weight balance ratio $\beta$ is optionally set according to the frequency of use of the second color chart 52 compared to the first color chart 51, by the operator. The operator sets up the first and second weight balance ratios $\alpha$ and $\beta$ by operating direction keys 32a~32d, the decision key 32e, and the ratio setting key 32h.

The third red, green, and blue adjustment parameters $Pr_3$, $Pg_3$, and $Pb_3$ are calculated by using the first, and second red, green, and blue adjustment parameters $Pr_2$, $Pr_2$, $Pg_1$, $Pg_2$, $Pb_1$, and $Pb_2$; the first and second weight balance ratios $\alpha$ and $\beta$; and $$Pr_3=Pr_1 \times \alpha \div (\alpha+\beta)+Pr_2 \times \beta \div (\alpha+\beta), Pg_3=Pg_1 \times \alpha \div (\alpha+\beta)+Pg_2 \times \beta \div (\alpha+\beta), \text{ and } Pb_3=Pb_1 \times \alpha \div (\alpha+\beta)+Pb_2 \times \beta \div (\alpha+\beta).$$

If there is a chance that the endoscope images of the photographic subject will consist of yellow and red mainly, the frequency of use of the first color chart 51 for the color adjustment, increases. Then, it is good if the first weight balance ratio α is set up to be bigger than the second weight balance ratio β, because the parameters become suitable for the actual situation.

If there is a chance that the endoscope images of the photographic subject will consist of yellow, red, and blue mainly, the frequency of use of the second color chart 52 for the color adjustment, increases. Then, it is good if the second weight balance ratio β is set up to be bigger than the first weight balance ratio α, because the parameters become suitable for the actual situation.

Specifically, for example, when a ratio of the frequency of use of the first color chart 51 and the frequency of use the second color chart 52 is 3:1, it is good if the first weight balance ratio is α=3, the second weight balance ratio is β=1 (α:β=3:1),so that the operator can set the values of the first and second weight balance ratios on the fifth screen pattern 38 by operating direction keys 32a~32d, the decision key 32e, and the ratio setting key 32h. In this case, the value of the third red, green, and blue adjustment parameters $Pr_3$, $Pg_3$, and $Pb_3$ are +2, +2, and +1. The difference between the first red adjustment parameter $Pr_1$ and the third red adjustment parameter $Pr_3$ is smaller than the difference between the third red adjustment parameter $Pr_3$ and the second red adjustment parameter $Pr_2$.

Furthermore, each color cell has the same rectangular shape in the grid state and the linear state which composes the color chart. However, each color chart does not have to be rectangular, as long as the form of each chart is the same.

Further, the color adjustment apparatus 31 does not have to be included in the color printer 30. The color adjustment apparatus 31 may be a different body or structure that is connected with the color printer 30 and is able carry out the color adjustment of the color printer 30.

Also, the color adjustment apparatus 31 does not have to have a color adjustment indication function. The color monitor 40, can function as the adjustment indication unit 33. In this case, the color adjustment apparatus 31 has direction keys 32a~32d, the decision key 32e,the first screen pattern 34 etc. Also, the color adjustment apparatus 31 has a function for indicating the first screen pattern 34 etc. on the color monitor 40.

The value of the ratio of each color cell does not have to be the same as in these embodiments. Accordingly, a gradation with other ratios may be used. Also, the first color chart 51 etc. is in a grid state where the color cells are arranged from length and breadth, but the color chart may be in a linear state consisting of only one row or one column. Even in this case, it is possible to have gradation for each color cell by using 2 or 3 colors, red, green, and blue. In this situation, each adjustment parameter value is changed.

The colors of the color cells that compose the color chart are prepared by blending red, green, and blue, which are the three primaries, according to a predetermined ratio, in an additive color process. However, the color may be prepared by blending yellow, magenta, and cyan which are the alternative three primaries, according to a predetermined ratio, in a subtractive color process. In this situation, each adjustment parameter value is changed.

The first and third color charts 51 and 51' have two colors which are red and green. However, they may have two colors which are red and blue, or green and blue. The first and third color chart 51 and 51' are effective for medical treatment. However, there are cases where other combinations of colors would be effective for other treatments.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2003-202253 (filed on Jul. 28, 2003) and 2003-202383 (filed on Jul. 28, 2003), which are expressly incorporated herein by reference, in their entirety.

The invention claimed is:

1. A method for the color adjustment of a color printer and a color monitor attached to an endoscope, the color printer outputting images obtained by the endoscope, the color monitor outputting images obtained by the endoscope, the method comprising:

performing a first imaging process in which said endoscope images a first color chart, a first comparing process in which a first output image of said first color chart output by said color printer, is compared with a second output image of said first color chart output by said color monitor, a first adjusting process in which first red, green, and blue adjustment parameters are changed on a basis of said first comparing process, and a first setting up process in which said first red, green, and blue adjustment parameters are set up on a basis of said first adjusting process;

performing a second imaging process in which said endoscope images a second color chart, a second comparing process in which a third output image of said second color chart output by said color printer, is compared with a fourth output image of said second color chart output by said color monitor, a second adjusting process in which second red, green, and blue adjustment parameters are changed on a basis of said second comparing process, and a second setting up process in which said second red, green, and blue adjustment parameters are set up on a basis of said second adjusting process, a color constitution of said first color chart being different than a color constitution of said second color chart; and performing a computing process in which third red, green, and blue adjustment parameters which are optimal for said color printer and said color monitor, are computed on a basis of said first and second red, green, and blue adjustment parameters;

said first color chart comprising a predetermined number of color cells, wherein said predetermined number of cells of said first color chart have a same form, and are arranged in one of a grid configuration and a linear configuration, each of said color cells being formed by blending only two colors from a group of three colors, the group of colors comprising red, green, and blue, according to a predetermined ratio, in an additive color process, said color cells showing a gradation of color such that a color tone of each of said color cells changes continuously in one direction;

said second color chart comprising a predetermined number of color cells, said predetermined number of cells of said second color chart have said same form, and are arranged in one of said grid configuration and said linear configuration, each of said color cells being formed by blending three colors comprising red, green, and blue, according to a predetermined ratio, said color cells showing a gradation of color such that a color tone of each of said color cells changes continuously in one direction;

said first and second red adjustment parameters being for adjustment of a cyan and red complementary color relationship;

said first and second green adjustment parameters being for adjustment of a magenta and green complementary color relationship; and said first and second blue adjustment parameters being for adjustment of a yellow and blue complementary color relationship;

said third red adjustment parameter being computed on a basis of first and second red values;

said third green adjustment parameter being computed on a basis of first and second green values;

said third blue adjustment parameter being computed on a basis of first and second blue values;

said first red value being computed by multiplying said first red adjustment parameter by a first weight balance ratio which is set up on a basis of a frequency of use of said first color chart;

said first green value being computed by multiplying said first green adjustment parameter by said first weight balance ratio;

said first blue value being computed by multiplying said first blue adjustment parameter by said first weight balance ratio;

said second red value being computed by multiplying said second red adjustment parameter by a second weight balance ratio which is set up on a basis of a frequency of use of said second color chart;

said second green value being computed by multiplying said second green adjustment parameter by said second weight balance ratio; and said second blue value being computed by multiplying said second blue adjustment parameter by said second weight balance ratio.

2. The method according to claim 1, wherein one of said two colors of said first color chart is red and an other of said two colors of said first color chart is green.

3. The method according to claim 2, wherein, with respect to a color gradient of each of said color cells of said first color chart, red increases continuously in each of said color cells in a first direction which is one of a length and breadth direction of a grid which forms said first color chart, and green increases continuously in each of said color cells in a second direction which is one of said length and breadth directions of said grid, and is different from said first direction.

4. The method according to claim 3, wherein an outer layer of cells of said grid of said first color chart has first, second, third, and fourth apexes;

said first apex being located in a first corner cell of said grid;

said second apex being located in a second corner cell of said grid which is spaced in said first direction from said first apex;

said third apex being located in a third corner cell of said grid which is spaced in said second direction from said first apex;

said fourth apex being located in a fourth corner cell of said grid which is spaced in said second direction from said second apex;

said first corner cell representing said first apex, having red 0%, and green 0%;

said second corner cell representing said second apex, having red 100%, and green 0%;

said third corner cell representing said third apex, having red 0%, and green 100%; and said fourth corner cell representing said fourth apex, having red 100%, and green 100%.

5. The method according to claim 1, wherein, with respect to a color gradient of each of said color cells of said second color chart, red increases continuously in each of said color cells in a first direction which is one of a length and breadth direction of a grid which forms said second color chart, green increases continuously in each of said color cells in a second direction which is one of said length and breadth directions of said grid and is different from said first direction, and blue decreases continuously in each of said color cells, in said first direction.

6. The method according to claim 5, wherein an outer layer of cells of said grid of said second color chart has first, second, third, and fourth apexes;

said first apex being located in a first corner cell of said grid;

said second apex being located in a second corner cell of said grid which is spaced in said first direction from said first apex;

said third apex being located in a third corner cell of said grid which is spaced in said second direction from said first apex;

said fourth apex being located in a fourth corner cell of said grid which is spaced in said second direction from said second apex;

said first corner cell representing said first apex, having red 0%, green 0%, and blue 100%;

said second corner cell representing said second apex, having red 100%, green 0%, and blue 0%;

said third corner cell representing said third apex, having red 0%, green 100%, and blue 100%; and said fourth corner cell representing said fourth apex, having red 100%, green 100%, and blue 0%.

7. An endoscope, comprising:

a color printer which outputs images obtained by said endoscope;

a color monitor which outputs images obtained by said endoscope; and a color adjustment apparatus which stores first and second red, green, and blue adjustment parameters and computes third red, green, and blue adjustment parameters on a basis of said first and second red, green, and blue adjustment parameters for carrying out a color adjustment process of said color printer and said color monitor;

said color adjustment process comprising:

performing a first imaging process in which said endoscope images a first color chart, a first comparing process in which a first output image of said first color chart output by said color printer, is compared with a second output image of said first color chart output by said color monitor, a first adjusting process in which said first red, green, and blue adjustment parameters are changed on a basis of said first comparing process, and a first setting up process in which said first red, green, and blue adjustment parameters are set up on a basis of said first adjusting process;

performing a second imaging process in which said endoscope images a second color chart, a second comparing process in which a third output image of said second color chart output by said color printer, is compared with a fourth output image of said second color chart output by said color monitor, a second adjusting process in which second red, green, and blue adjustment parameters are changed on a basis of said second comparing process, and a second setting up process in which said second red, green, and blue adjustment parameters are set up on a basis of said second adjusting process, a color constitution of said first color chart being different than a color constitution of said second color chart;

said first color chart comprising a predetermined number of color cells, wherein said predetermined number of cells of said first color chart have a same form, and are arranged in one of a grid configuration and a linear configuration, each of said color cells being formed by blending only two colors from a group of three colors, the group of colors comprising red, green, and blue, according to a predetermined ratio, in an additive color process, said color cells showing a gradation of color such that a color tone of each of said color cells changes continuously in one direction;

said second color chart comprising a predetermined number of color cells, said predetermined number of cells of said second color chart have said same form, and are arranged in one of said grid configuration and said linear configuration, each of said color cells being formed by blending three colors comprising red, green, and blue, according to a predetermined ratio, said color cells showing a gradation of color such that a color tone of each or said color cells changes continuously in one direction;

said third blue adjustment parameter being computed on a basis of first and second blue values;

said first and second green adjustment parameters being for adjustment of a magenta and green complementary color relationship;

said first and second blue adjustment parameters being for adjustment of a yellow and blue complementary color relationship;

said third red adjustment parameter being computed on a basis of first and second red values;

said third green adjustment parameter being computed on a basis of first and second green values;

said third blue adjustment parameter is computed on the basis of first and second blue values;

said first red value being computed by multiplying said first red adjustment parameter by a first weight balance ratio which is set up on a basis of a frequency of use of said first color chart;

said first green value being computed by multiplying said first green adjustment parameter by said first weight balance ratio;

said first blue value being computed by multiplying said first blue adjustment parameter by said first weight balance ratio;

said second red value being computed by multiplying said second red adjustment parameter by a second weight balance ratio which is set up on a basis of a frequency of use of said second color chart;

said second green value being computed by multiplying said second green adjustment parameter by said second weight balance ratio; and said second blue value being computed by multiplying said second blue adjustment parameter by said second weight balance ratio.

* * * * *